(12) United States Patent
Tilekar

(10) Patent No.: US 10,282,441 B2
(45) Date of Patent: May 7, 2019

(54) OPERATION ANALYTIC REPOSITORY CENTRAL MONITORING SYSTEM

(71) Applicant: BANK OF AMERICA CORPORATION, Charlotte, NC (US)

(72) Inventor: Ulhas Shashikant Tilekar, Maharashtra (IN)

(73) Assignee: Bank of America Corporation, Charlotte, NC (US)

(*) Notice: Subject to any disclaimer, the term of this patent is extended or adjusted under 35 U.S.C. 154(b) by 363 days.

(21) Appl. No.: 14/588,426

(22) Filed: Jan. 1, 2015

(65) Prior Publication Data

US 2016/0196294 A1 Jul. 7, 2016

(51) Int. Cl.
*G06F 17/30* (2006.01)
*G06F 21/31* (2013.01)
*G06F 21/60* (2013.01)

(52) U.S. Cl.
CPC .. *G06F 17/30348* (2013.01); *G06F 17/30303* (2013.01); *G06F 17/30371* (2013.01); *G06F 21/31* (2013.01); *G06F 21/604* (2013.01)

(58) Field of Classification Search
CPC ......... G06F 17/30348; G06F 17/30303; G06F 17/30371; G06F 21/31; G06F 21/604
See application file for complete search history.

(56) References Cited

U.S. PATENT DOCUMENTS

| | | | | |
|---|---|---|---|---|
| 9,253,033 B2* | 2/2016 | Moran | ................ | H04L 41/0253 |
| 9,477,661 B1* | 10/2016 | Chamness | ............... | G06F 11/14 |
| 2003/0237000 A1* | 12/2003 | Denton | ............... | H04L 63/1416 726/23 |
| 2007/0168053 A1* | 7/2007 | Hendrickson | .......... | G05B 15/02 700/28 |
| 2007/0233991 A1* | 10/2007 | Diao | ..................... | G06F 9/5016 711/170 |
| 2009/0138427 A1* | 5/2009 | Kalavade | ........... | G06Q 10/0637 |
| 2011/0099420 A1* | 4/2011 | MacDonald McAlister et al. | | G06F 11/2025 714/6.32 |
| 2011/0277019 A1* | 11/2011 | Pritchard, Jr. | ...... | H04L 63/0815 726/4 |
| 2011/0282832 A1* | 11/2011 | Rishel | ................... | G06F 9/5083 707/609 |
| 2013/0179461 A1* | 7/2013 | Sharma | ............... | G06F 11/3055 707/769 |

(Continued)

*Primary Examiner* — Ashish Thomas
*Assistant Examiner* — Dustin D Eyers
(74) *Attorney, Agent, or Firm* — Michael A. Springs; Moore & Van Allen PLLC; Peter B. Stewart

(57) ABSTRACT

Embodiments of the invention are directed to systems, methods and computer program products for use in financial systems, where messages are automatically generated based on message templates. An exemplary apparatus is configured to access one or more databases within an operation analytic repository having data stored therein; store in the at least one database, for a predetermined time period, for analysis; process, for at least one of the databases, a proactive action whereby the proactive action implements an ongoing health assessment of the data stored within the at least one database; and in response to receiving indication of an issue within at least one of databases, provide a reactive action whereby the reactive action determines one or more steps necessary to correct the issue.

17 Claims, 15 Drawing Sheets

(56) References Cited

U.S. PATENT DOCUMENTS

| | | | | |
|---|---|---|---|---|
| 2013/0282865 A1* | 10/2013 | Baptist | ............. | H04L 67/16 709/217 |
| 2014/0279103 A1* | 9/2014 | Course | ............. | G06Q 20/206 705/18 |
| 2014/0324469 A1* | 10/2014 | Reiner | ............. | G06F 19/322 705/3 |
| 2015/0026208 A1* | 1/2015 | Kuhmuench | ....... | G06F 21/6218 707/769 |
| 2015/0040052 A1* | 2/2015 | Noel | ............. | G06F 3/04847 715/771 |
| 2016/0127352 A1* | 5/2016 | Xu | ............. | H04L 63/0815 726/8 |

* cited by examiner

| ⊙ NODE STATUS INTO | | | | | | | | |
|---|---|---|---|---|---|---|---|---|
| NODE NAME ⬥ | HOST NAME | CURRENT STATE | NODE ADDRESS | EXPORT ADDRESS | CATALOG PATH | isEPHEMERA | PROCESS SIZE (BYTES) | PROCESS RESIDENT SET SIZE | PROCESS SHARE MEMORY |
| NODE 1 | XXX.XXX.XX.1 | UP | XXX.XXX.XX.1 | XXX.XXX.XX.1 | PATH 1 | 1 | 30282300672 | 12228444160 | 31080448 |
| NODE 2 | XXX.XXX.XX.2 | UP | XXX.XXX.XX.2 | XXX.XXX.XX.2 | PATH 2 | 1 | 29793247232 | 11975693984 | 30195712 |
| NODE 3 | XXX.XXX.XX.3 | UP | XXX.XXX.XX.3 | XXX.XXX.XX.3 | PATH 3 | 1 | 32153358336 | 14098966176 | 29810680 |
| NODE 4 | XXX.XXX.XX.4 | UP | XXX.XXX.XX.4 | XXX.XXX.XX.4 | PATH 4 | 1 | 29894706046 | 11363756300 | 29800920 |
| NODE 5 | XXX.XXX.XX.5 | UP | XXX.XXX.XX.5 | XXX.XXX.XX.5 | PATH 5 | 1 | 34236940288 | 16417259520 | 30547960 |

WELCOME USER | LOGOUT
HOME | RESOURCE USAGE | USER INFO | DATABASE INFO | SYSTEM INFO | DATABASE TUNING | ROLE & GRANTS | ADMINISTRATION

USER LOGIN FEATURES

| POOL NAME ⇅ | AVG_MEM_ACTUAL(kb) | AVG_MEM_INUSE(kb) | AVG_MEM_BORRWED(kb) | AVG_GEN_BORRWED(kb) |
|---|---|---|---|---|
| SYSDATA GENERAL | 102400 | 102400 | 439541 | 439541 |
| | 111914320 | | | 0 |

VIEW 1 - 2 OF 2

RESOURCE POOL STATUS

POOL STATUS SUMMARY
500.00K
400.00K — 435.54K
300.00K
200.00K — 102.40K
100.00K
0.00K
SYSDATA GENERAL
POOL NAME

USER SESSIONS

| NODE NAME ⇅ | POOL NAME | REJECTED REASON | REJECTION TYPE | COUNT | FIRST REJECTED | LAST REJECTED | LAST REJECTED VALUE |
|---|---|---|---|---|---|---|---|
| NODE0001 | TEST | REQUEST EXCEEDED HIGH LIMIT | MEMORY (KB) | 11 | 2014-07-17 13:04:38:034000 | 2014-07-18 18:39:09:756000 | 2097153 |
| NODE0001 | POOL | REQUEST EXCEEDED HIGH LIMIT | MEMORY (KB) | 53 | 2013-05-21 05:10:39:850000 | 2014-03-31 10:30:17:957000 | 79126314 |
| NODE0001 | POOL | REQUEST FOR RESOURCE WAS CANCELED | MEMORY (KB) | 3 | 2015-05-26 23:13:57:229000 | 2013-11-14 11:47:37:754000 | 1642744 |
| NODE0001 | POOL | REQUEST FOR RESOURCE WAS CANCELED | QUERIES | 35 | 2013-08-02 08:19:50:459000 | 2013-12-31 08:52:10:982000 | 1 |
| NODE0001 | POOL | TIMEOUT WAITING FOR RESOURCE REQUEST | MEMORY (KB) | 23 | 2013-11-14 08:05:59:122000 | 2013-12-31 08:57:36:667000 | 22373632 |
| NODE0001 | POOL | TIMEOUT WAITING FOR RESOURCE REQUEST | QUERIES | 143 | 2013-08-02 08:19:58:422000 | 2013-08-02 10:16:02:790000 | 1 |
| NODE0001 | POOL | REQUEST EXCEEDED HIGH LIMIT | MEMORY (KB) | 2292 | 2015-04-05 10:19:06:397000 | 2013-07-16 23:55:47:790000 | 9 |
| NODE0002 | TEST | REQUEST EXCEEDED HIGH LIMIT | MEMORY (KB) | 12 | 2014-07-17 13:04:39:055000 | 2014-07-22 09:16:12:548000 | 2097153 |
| NODE0002 | POOL | REQUEST FOR RESOURCE WAS CANCELED | MEMORY (KB) | 51 | 2013-05-21 05:27:34:694000 | 2014-03-31 10:80:17:957000 | 79111623 |
| NODE0002 | POOL | REQUEST FOR RESOURCE WAS CANCELED | MEMORY (KB) | 2 | 2013-05-24 08:01:28:212000 | 2013-05-26 25:10:57:226000 | 18944 |

VIEW 1 - 10 OF 36

CENTRAL WEB-BASED MONITORING SYSTEM (CMS)

WELCOME USER                                                                                    LOGOUT

HOME | RESOURCE USAGE | USER INFO | DATABASE INFO | SYSTEM INFO | DATABASE TUNING | ROLE & GRANTS | ADMINISTRATION

USER LOGIN FEATURES

| NODE NAME ⇔ | USER NAME | DATA BASE NAME | LOGIN TIME STAMP | CLIENT HOST NAME | REASON |
|---|---|---|---|---|---|
|  |  |  |  |  |  |
|  |  |  |  |  |  |
|  |  |  |  |  |  |

PAGE [0] OF 1 | ►► | [25 ▼]

910

USER SESSIONS

| NODE NAME ⇔ | USER NAME | SESSION ID | TRANSACTION ID | SESSION START TIME | SESSION END TIME | IS ACTIVE | CLIENT HOST NAME | CLIENT PID |
|---|---|---|---|---|---|---|---|---|
| NODE 1 | USER 1 | SESSION 1 | -1 | 2014-08-24 23:46:48:561000 | NULL | 1 | XXX.XXX.XXX.XX | 1 |
| NODE 1 | USER 1 | SESSION 2 | -1 | 2014-08-24 23:46:48:745000 | NULL | 1 | XXX.XXX.XXX.XX | 1 |
| NODE 1 | USER 1 | SESSION 3 | -1 | 2014-08-24 23:46:48:926000 | NULL | 1 | XXX.XXX.XXX.XX | 1 |
| NODE 1 | USER 1 | SESSION 4 | -1 | 2014-08-24 23:46:48:132000 | NULL | 1 | XXX.XXX.XXX.XX | 1 |
| NODE 1 | USER 1 | SESSION 5 | 4503599260017710 | 2014-08-24 23:46:48:316000 | NULL | 1 | XXX.XXX.XXX.XX | 1 |
| NODE 1 | USER 1 | SESSION 6 | 4503599260017705 | 2014-08-24 23:46:48:345000 | NULL | 1 | XXX.XXX.XXX.XX | 2 |

|◄◄ ◄ PAGE [1] OF 10 | ►► | [10 ▼]          VIEW 1 - 6 OF 5

| HOME | RESOURCE USAGE | USER INFO | DATABASE INFO | SYSTEM INFO | DATABASE TUNING | ROLE & GRANTS | ADMINISTRATION |

THIS DISPLAYS FOR EACH PROJECTION OF EACH PARTITIONED TABLE, THE FRACTION OF ITS DATA THAT IS ACTUALLY PARTITIONED ACCORDING TO THE CURRENT PARTITION EXPRESSION. WHEN THE PARTITIONING OF A TABLE IS ALTERED, THE VALUE IN 'PARTITION REORGANIZE PERCENT' FOR EACH OF ITS PROJECTIONS DROPS TO ZERO AND GOES BACK UP TO 100 WHEN ALL THE DATA IS REPARTITIONED.

DATABASE PARTITION STATUS

| TABLE ID | TABLE NAME | TABLE SCHEMA | PROJECTION ID | PROJECTION NAME | PROJECTION SCHEMA | PARTITION REORG PERCENT (%) |
|---|---|---|---|---|---|---|
| 1 | NAME 1 | SCHEMA A | 1 | NAME 1 | SCHEMA A | 100 |
| 2 | NAME 2 | SCHEMA B | 2 | NAME 2 | SCHEMA B | NULL |
| 3 | NAME 3 | SCHEMA B | 3 | NAME 2 | SCHEMA B | NULL |
| 4 | NAME 4 | SCHEMA A | 4 | NAME 3 | SCHEMA A | NULL |
| 5 | NAME 5 | SCHEMA A | 5 | NAME 4 | SCHEMA A | 100 |
| 6 | NAME 6 | SCHEMA C | 6 | NAME 5 | SCHEMA C | 100 |
| 7 | NAME 7 | SCHEMA D | 7 | NAME 6 | SCHEMA D | 100 |
| 8 | NAME 8 | SCHEMA D | 8 | NAME 6 | SCHEMA D | 100 |
| 9 | NAME 9 | SCHEMA A | 9 | NAME 7 | SCHEMA A | 100 |
| 10 | NAME 10 | SCHEMA A | 10 | NAME 8 | SCHEMA A | 100 |

| PAGE [ ] OF 3 | VIEW 1 - 10 OF 29

THE BELOW TABLE USES THE VMART EXAMPLE DATABASE TO OBTAIN THE NUMBER OF ROWS AND SIZE OCCUPIED BY EACH TABLE IN THE DATABASE

DATABASE VOLUME STATUS

| TABLE NAME | ROW COUNT | BYTE COUNT |
|---|---|---|
| NAME 1 | 1428856912 | 141.27 GB |
| NAME 2 | 1201621240 | 125.46 GB |
| NAME 3 | 3251926574 | 106.64 GB |
| NAME 4 | 7175704368 | 99.31 GB |
| NAME 5 | 306620096 | 73.38 GB |
| NAME 6 | 714311976 | 71.05 GB |
| NAME 7 | 830873270 | 67.86 GB |
| NAME 8 | 1086852994 | 58.96 GB |
| NAME 9 | 1561000836 | 57.77 GB |
| NAME 10 | 785618052 | 37.91 GB |

| PAGE [ ] OF 3 | VIEW 1 - 10 OF 869

| WELCOME USER | | | | | |
|---|---|---|---|---|---|
| HOME | RESOURCE USAGE | USER INFO | DATABASE INFO | SYSTEM INFO | DATABASE TUNING | ROLE & GRANTS | ADMINISTRATION |

ROLE FOR USERS: [ USER 1 ] [GO >] — 1230
ENTER USERIDS SEPERARTE BY COMMAS

USER ROLES — 1210

| USER NAME ⬥ | ALL ROLES | DEFAULT ROLES | IS SUPER USER | IS LOCKED |
|---|---|---|---|---|
| USER 1 | DBADMIN*, PSEUDOSUPERUSER* | DBADMIN*, PSEUDOSUPERUSER* | 1 | 1 |
| | | | | |
| | | | | |
| | | | | |
| | | | | |
| | | | | |

|◄◄ ◄ | PAGE [1] OF 1 | ► ►►| [10] ▼ |  VIEW 1 - 1 OF 1

1240 — GRANTEE: [DBOARDEV] [GO >]  OBJECT TYPE: [SCHEMA] [GO >] — 1250

USER GRANTS — 1220

| GRANTOR ⬥ | PRIVILEGES DESC. | OBJECT SCHEMA | OBJECT NAME | OBJECT TYPE | GRANTEE |
|---|---|---|---|---|---|
| GRANTOR 1 | USAGE, CREATE | NULL | NAME 1 | SCHEMA | GRANTEE1 |
| GRANTOR 1 | USAGE | NULL | NAME 1 | SCHEMA | GRANTEE1 |
| GRANTOR 1 | USAGE | NULL | NAME 2 | SCHEMA | GRANTEE1 |
| GRANTOR 1 | USAGE | NULL | NAME 2 | SCHEMA | GRANTEE1 |
| GRANTOR 1 | USAGE | NULL | NAME 2 | SCHEMA | GRANTEE1 |
| GRANTOR 1 | USAGE | NULL | NAME 2 | SCHEMA | GRANTEE1 |
| GRANTOR 1 | USAGE | NULL | NAME 2 | SCHEMA | GRANTEE1 |

|◄◄ ◄ | PAGE [ ] OF 10 | ► ►►| [10] ▼  VIEW 1 - 10 OF 246

OPERATION ANALYTIC REPOSITORY CENTRAL MONITORING SYSTEM

BACKGROUND

Traditionally, monitoring systems must rely on reactive resolution to rectify issues after receiving complaints from end users. This method can become very inefficient, and can additionally result in a mismanagement of resources as it can be fairly time consuming to spend time correcting issues that may have been otherwise prevented. Therefore, a need exists for a means to both proactively monitor data for issues, and in addition, to store monitored data for future analysis.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention are directed to systems, methods, and computer program products for providing an operation analytic repository central monitoring system. An exemplary apparatus for use in operation analytic repository database monitoring, whereby the apparatus provides centralized monitoring of one or more databases, may comprise a memory, a computing processor, and a module stored in the memory, said module comprising instruction code executable by one or more computing processors, and configured to cause the one or more computing processors to access one or more databases within an operation analytic repository having data stored therein; store at least a portion of the data stored within the at least one database, for a predetermined time period, for analysis; process, for at least one of the databases, a proactive action whereby the proactive action implements an ongoing health assessment of the data stored within the at least one database; and in response to receiving indication of an issue within at least one of databases, provide a reactive action whereby the reactive action determines one or more steps necessary to resolve the issue.

In some embodiments, the module is further configured to cause one or more computing processors to proactive action comprises run at least one monitoring script on the at least one database.

In some embodiments, launching the monitoring script of the at least one database may further comprise the module being configured to cause one or more computing processors to receive, based on an analysis of the script, a potential issue within at least one of databases.

In some embodiments, receiving indication of the potential issue with the at least one database may further comprise the module being configured to cause one or more computing processors to notify at least one party of the potential issue within the at least one of database.

In some embodiments, receiving indication of the potential issue with the at least one database may further comprise the module being configured to cause one or more computing processors to determine to automatically correct the potential issue within the at least one of database.

In some embodiments accessing one or more databases within the operation analytic repository may further comprise the module being configured to receive one or more authentication credentials; and prior to granting access to the one or more databases within the operation analytic repository, authenticate a user's identity based at least in part on validating the one or more authentication credentials.

In some embodiments, the module is configured to provide a central monitoring tool, and wherein the central monitoring tool comprises an interface such that information related to the one or more databases within the operation analytic repository is simultaneously displayed within the central monitoring tool; fetch data from the one or more databases within the operation analytic repository for presentation within the central monitoring tool; and present the fetched data from the one or more databases within the operation analytic repository.

In some embodiments, storing the at least a portion of the data stored within the at least one database may further comprise the module being configured to analyze the data stored on periodic, semi-periodic, or continuous basis.

In some embodiments analyzing the stored data may further comprise the module being configured to monitor the stored data; identify one or more parameters for improvement within the stored data; determine whether or not the one or more parameters for improvement within the stored data are necessary; and in response to determining the one or more parameters for improvement within the stored data are necessary, implementing at least one action to improve data within the at least one database.

In some embodiments, the module is configured to maintain a record log of indications of an issue within the at least one of databases.

In some embodiments the module is configured to analyze an indication of an issue within the at least one of databases; and determine, based on the results of the analysis, whether or not the issue can be resolved by the system.

In some embodiments, the module is configured to in response to determining the issue can be resolved by the system, implementing the one or more steps necessary to resolve the issue.

In some embodiments, the module is configured to in response to determining the issue cannot be resolved by the system, determining to automatically escalate the issue to a third party system or entity for resolution.

In some embodiments the module is configured to define a threshold value for determining whether or not a potential issue exist, wherein a value above the threshold indicates that a potential issue exist, and wherein a value below the threshold indicates that a potential issue does not exist; and determine, based on the threshold hold value, whether or not a potential issue exist.

The features, functions, and advantages that have been discussed may be achieved independently in various embodiments of the present invention or may be combined with yet other embodiments, further details of which can be seen with reference to the following description and drawings. Additionally, as will be appreciated by one of ordinary skill in the art, the features, functions, and advantages that have been discussed may include and/or be embodied as an apparatus (including, for example, a system, machine, device, computer program product, and/or the like), as a method (including, for example, a business method, computer-implemented process, and/or the like), or as any combination of the foregoing.

BRIEF DESCRIPTION OF THE DRAWINGS

Figure 1:
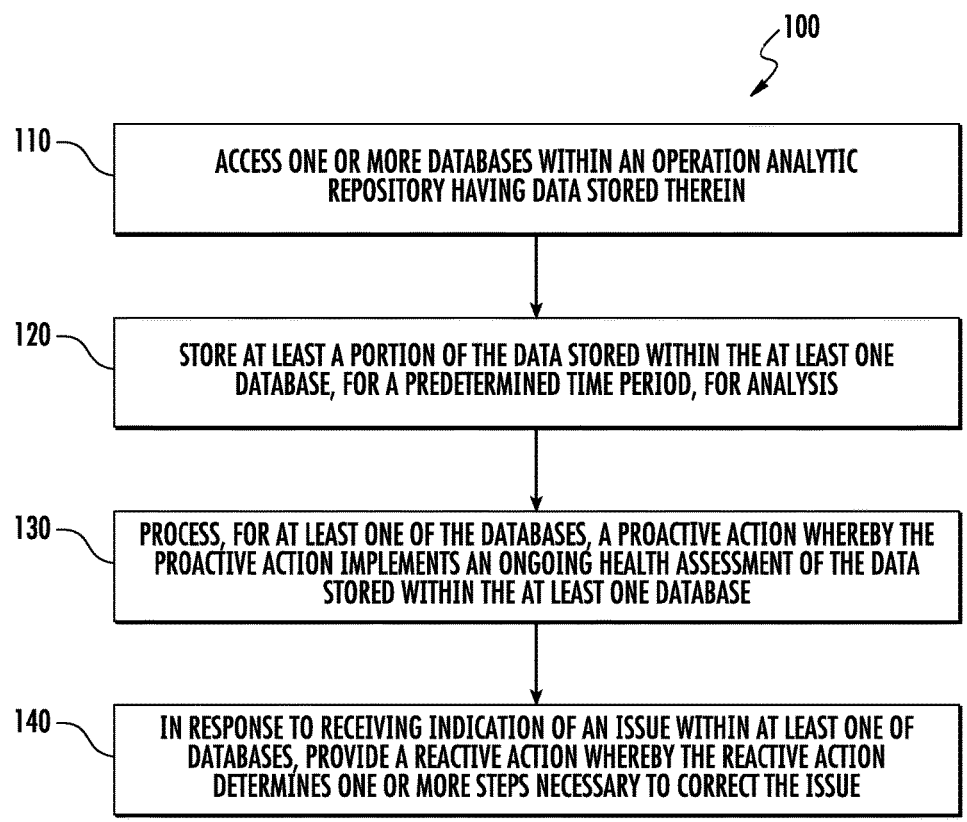
Figure 2:
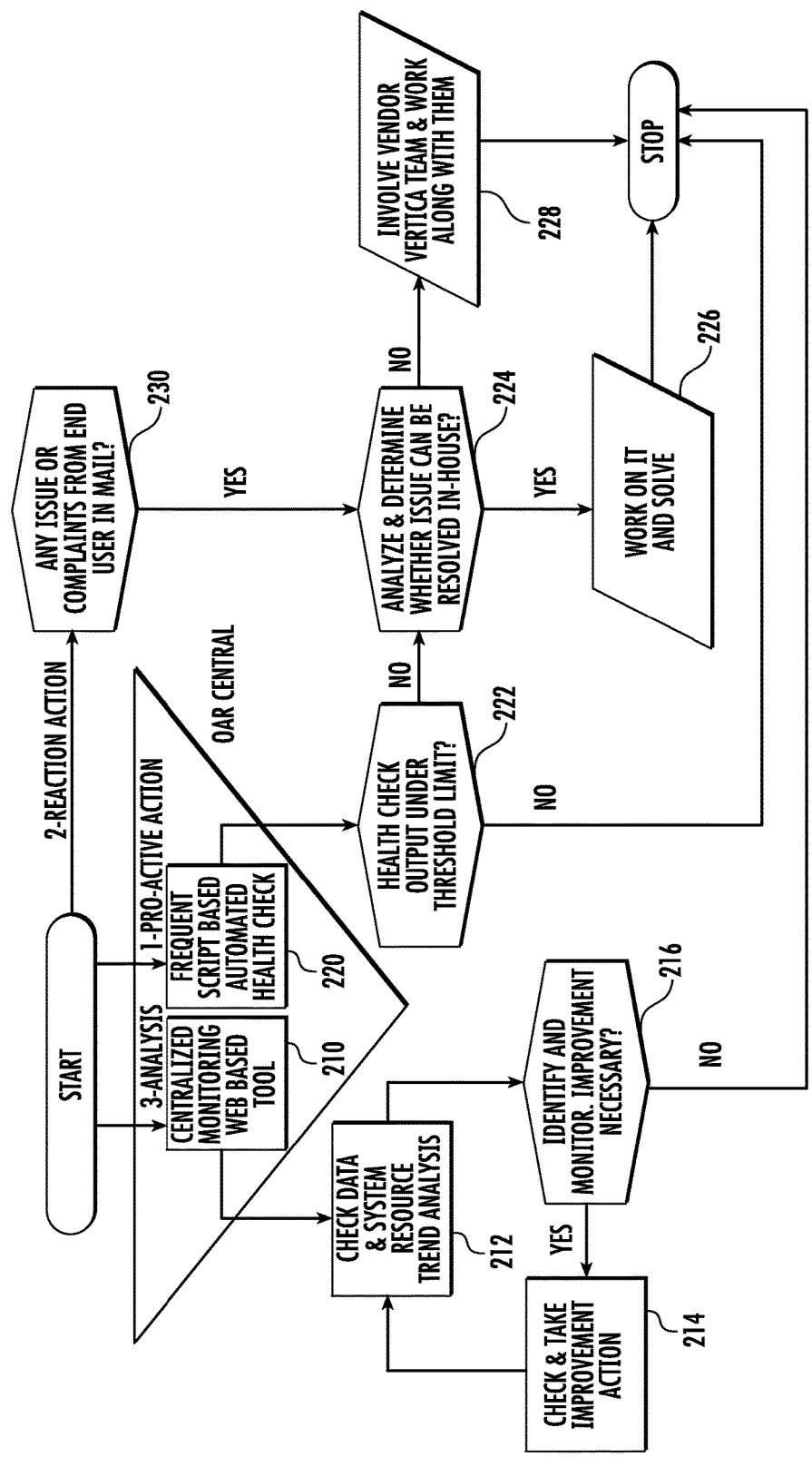
Figure 3:
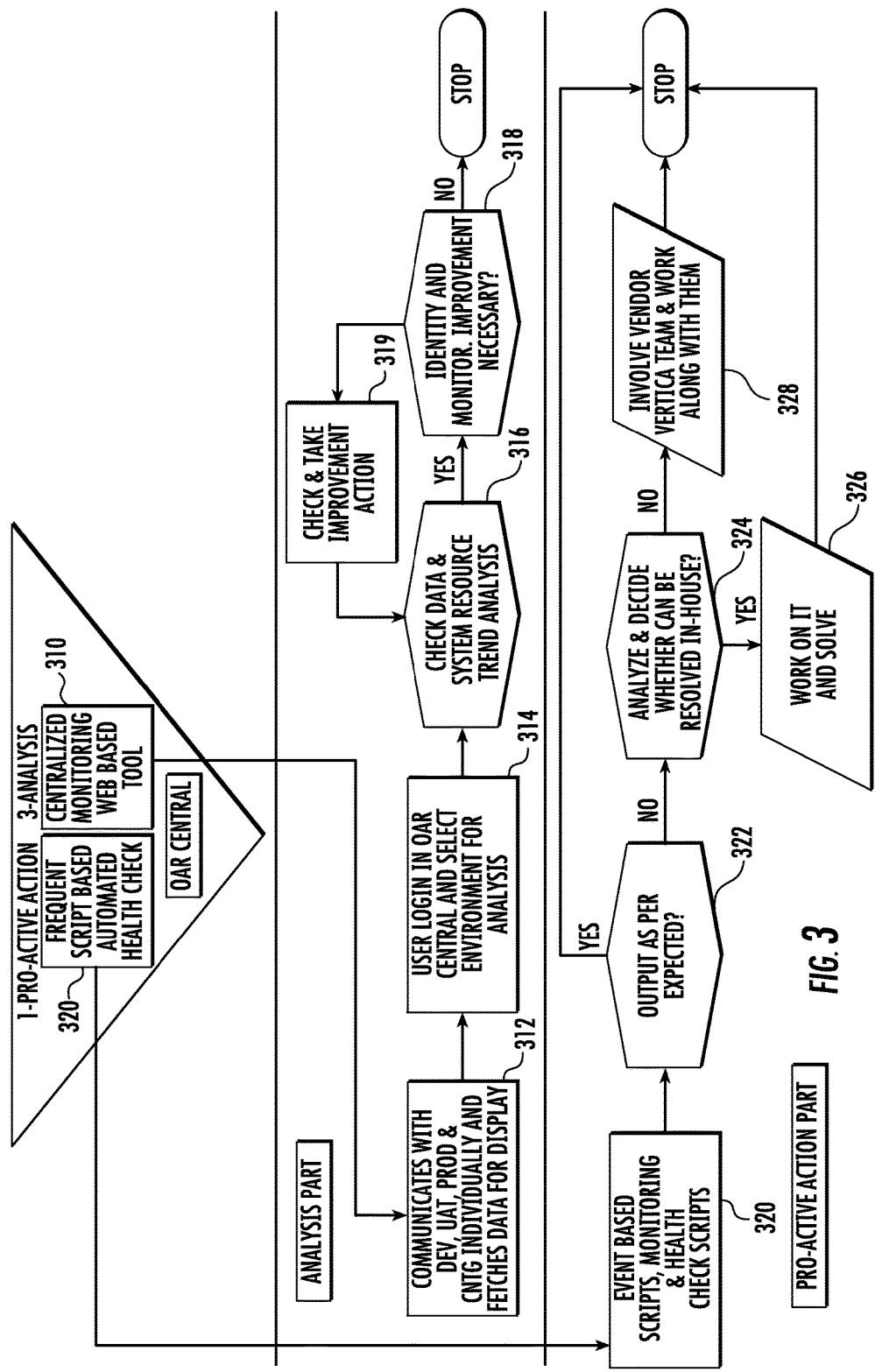
Figure 4:
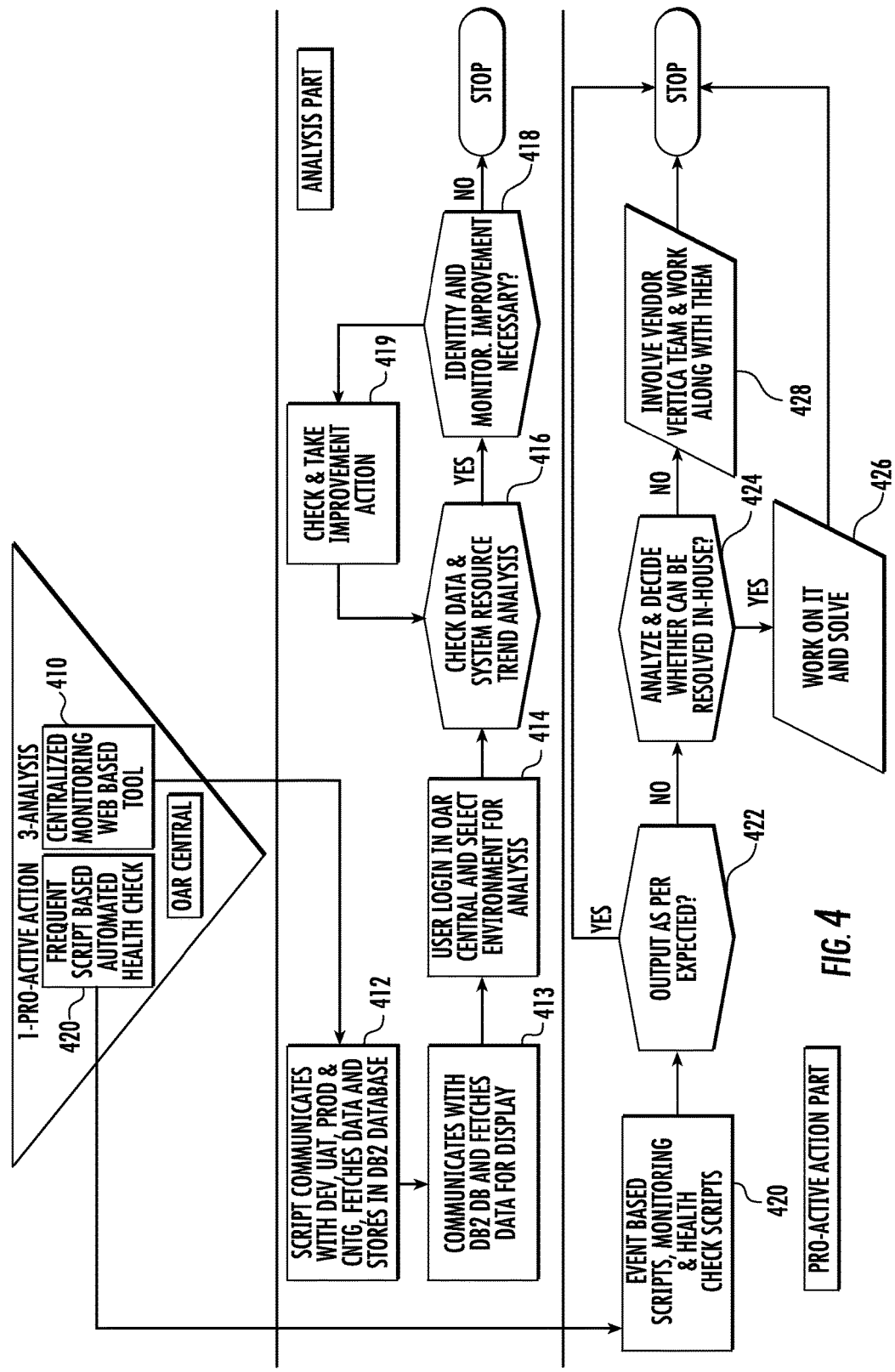
Figure 5:
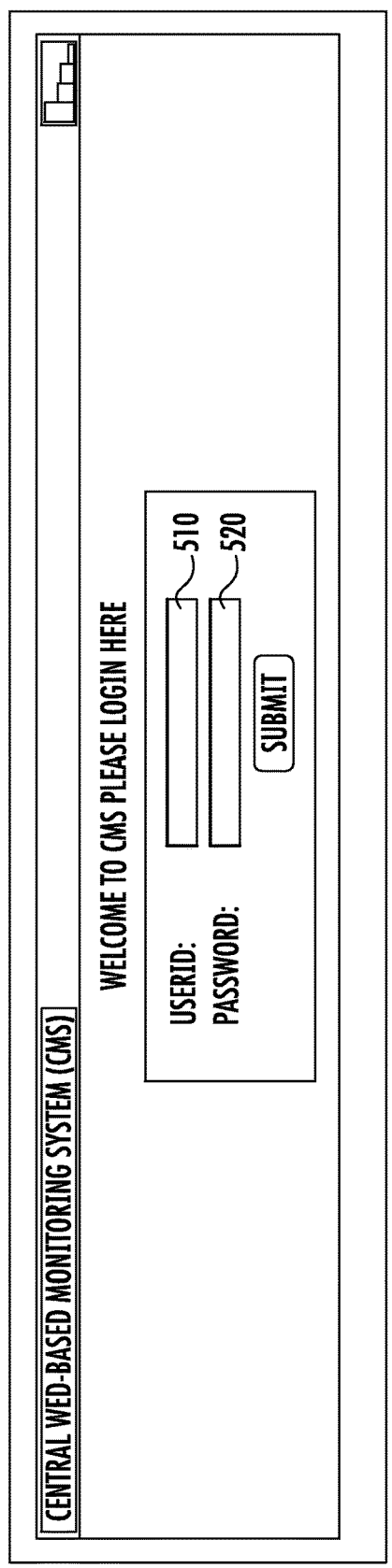
Figure 6:
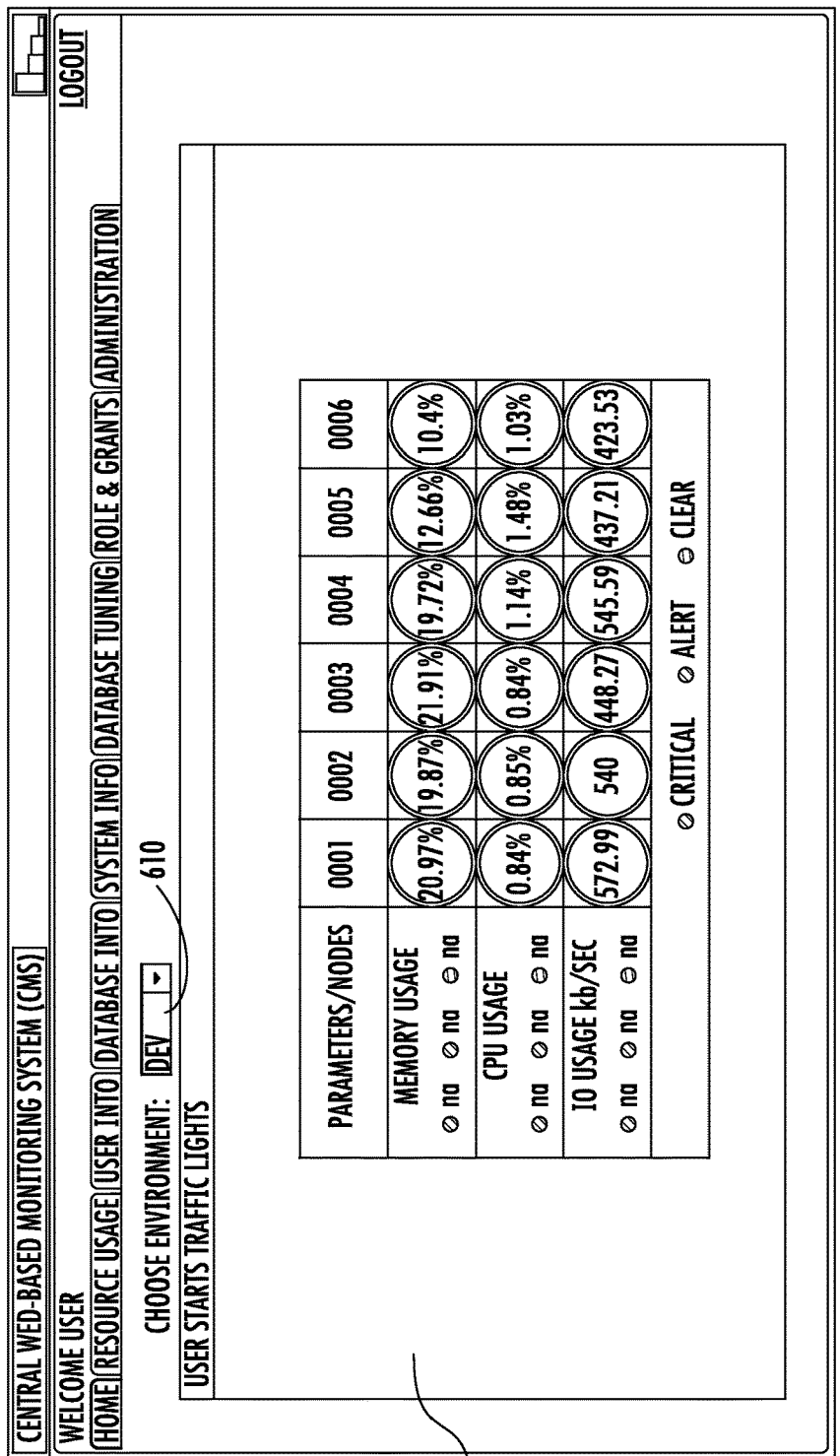
Figure 14:
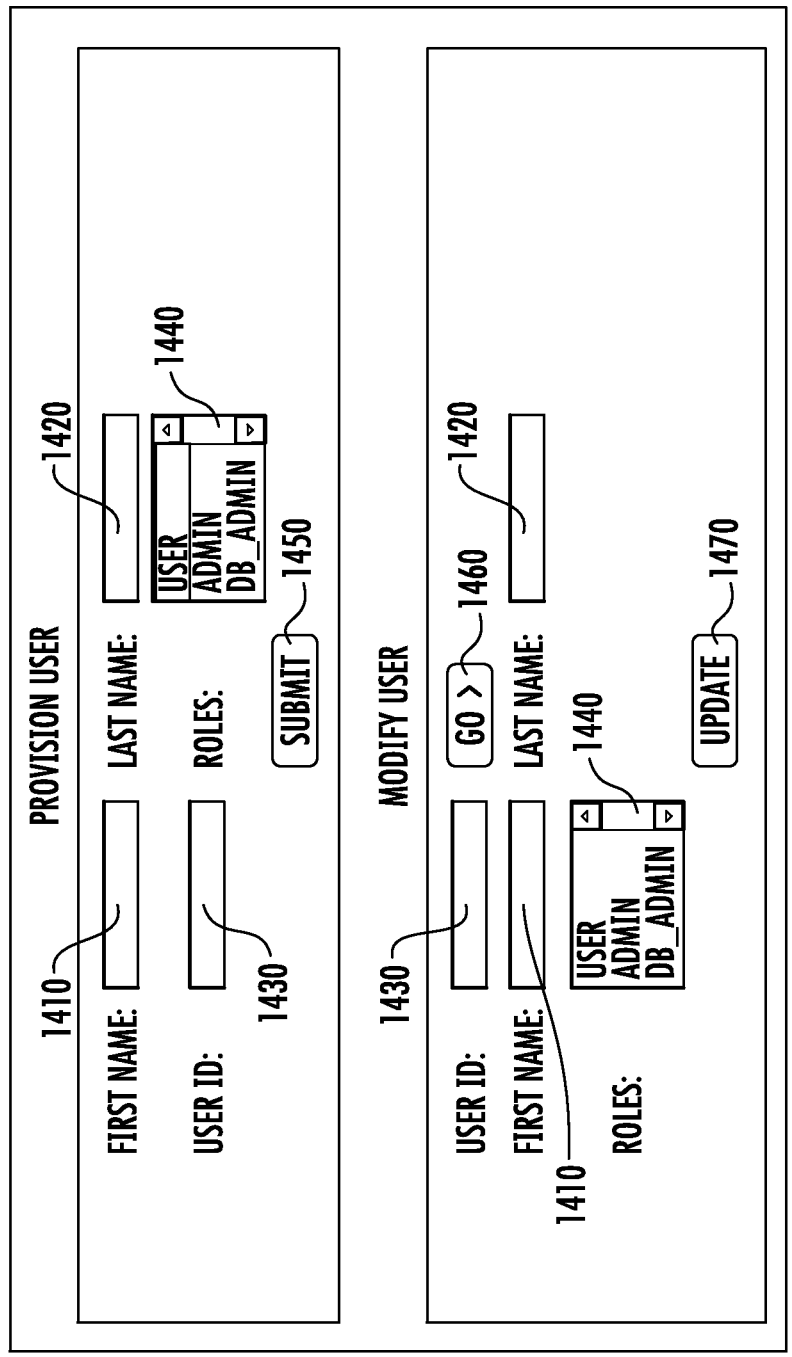
Figure 15:
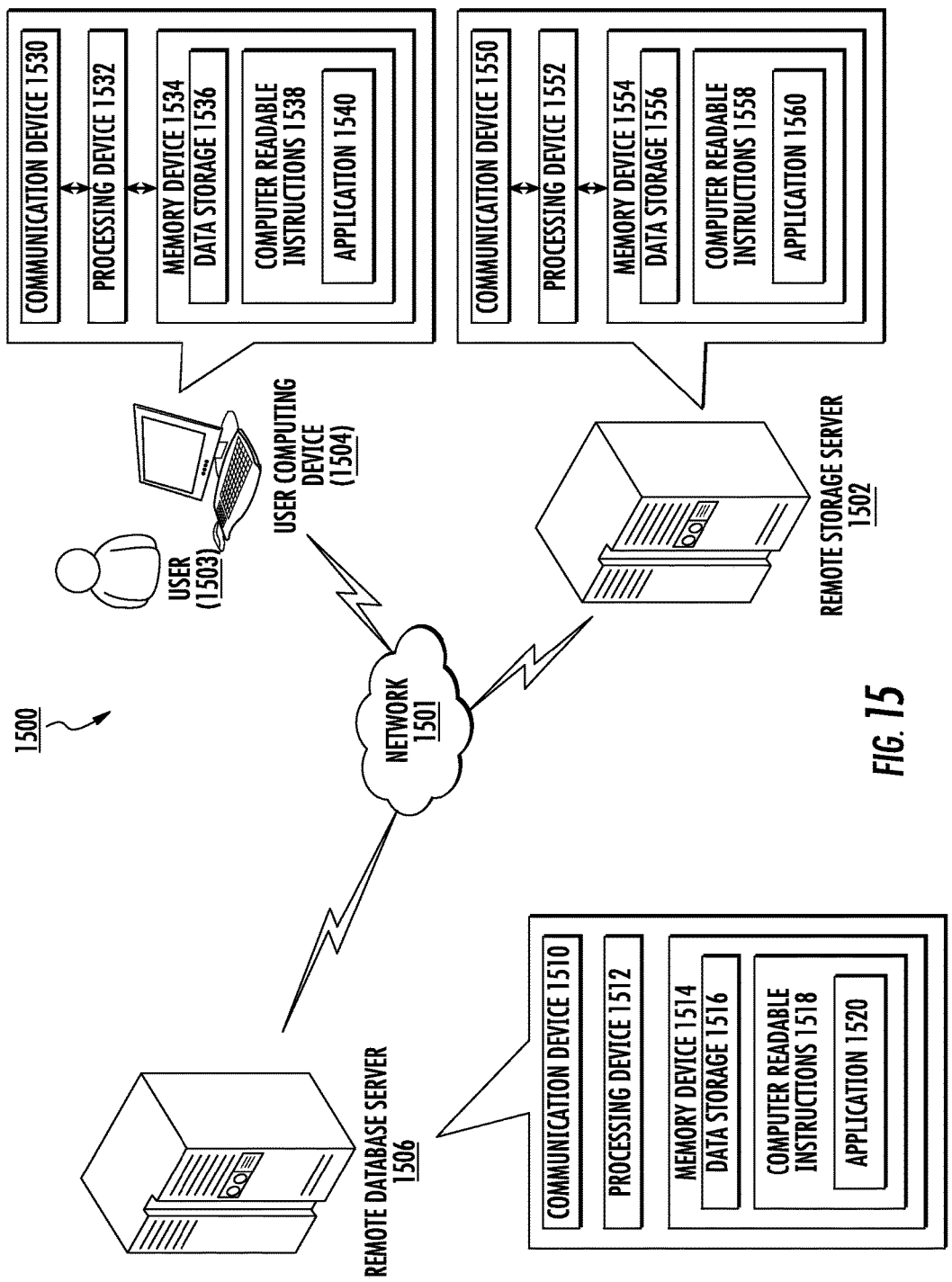

Having thus described embodiments of the invention in general terms, reference will now be made to the accompanying drawings, where:

FIG. 1 is a high level process flow for an operation analytic repository monitoring system, in accordance with embodiments of the present invention;

FIG. 2 is a detailed process flow for operation analytic repository monitoring system, in accordance with embodiments of the present invention;

FIG. 3 is a detailed process flow for operation analytic repository monitoring system, in accordance with embodiments of the present invention;

FIG. 4 is a detailed process flow for operation analytic repository monitoring system, in accordance with embodiments of the present invention;

FIG. 5 is a screenshot illustrating an operation analytic repository monitoring system tool, in accordance with embodiments of the present invention;

FIG. 6 is a screenshot illustrating an operation analytic repository monitoring system tool, in accordance with embodiments of the present invention;

FIG. 7 is a screenshot illustrating an operation analytic repository monitoring system tool, in accordance with embodiments of the present invention;

FIG. 8 is a screenshot illustrating an operation analytic repository monitoring system tool, in accordance with embodiments of the present invention;

FIG. 9 is a screenshot illustrating an operation analytic repository monitoring system tool, in accordance with embodiments of the present invention;

FIG. 10 is a screenshot illustrating an operation analytic repository monitoring system tool, in accordance with embodiments of the present invention;

Figure 11:
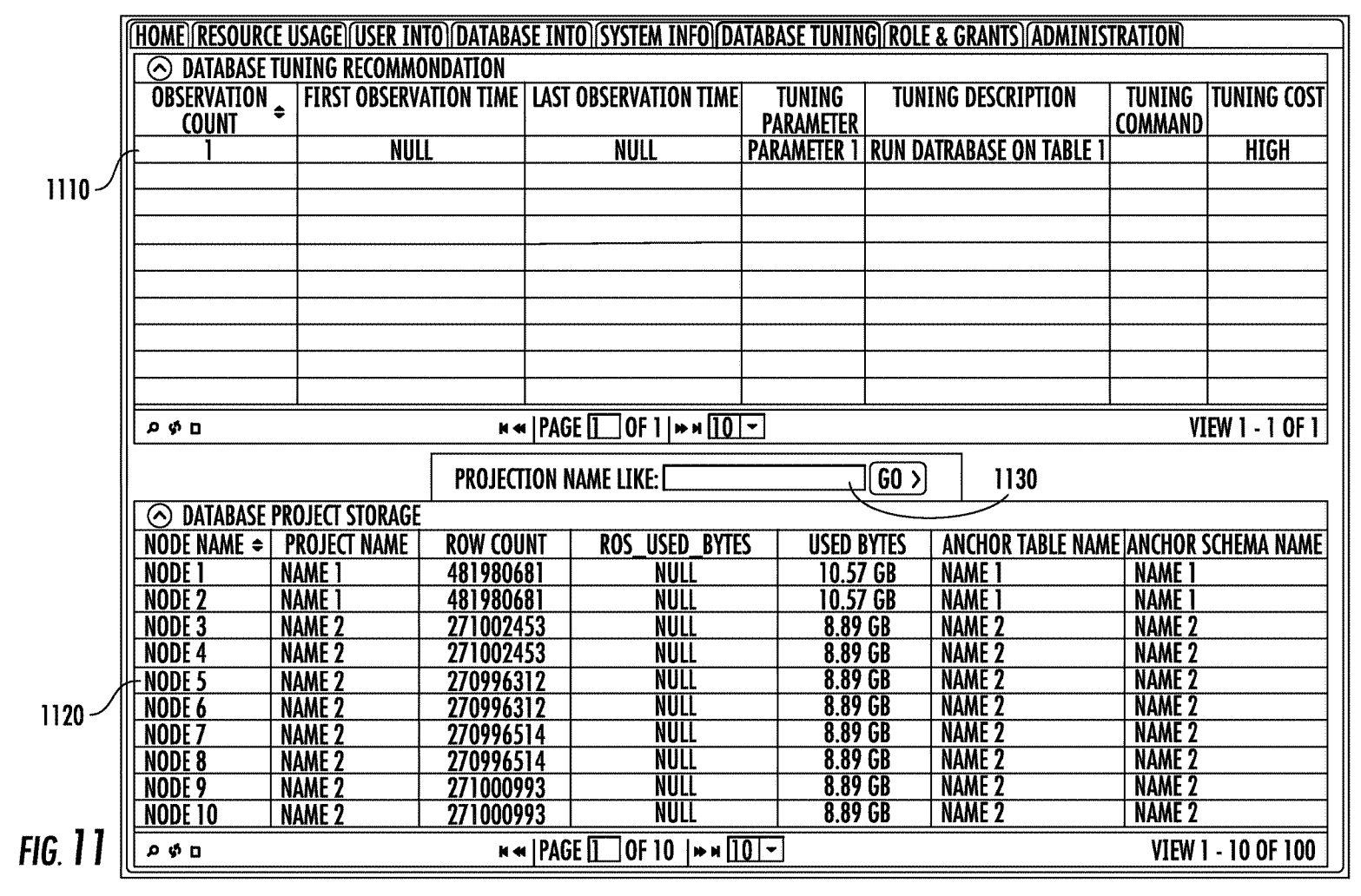

FIG. 11 is a screenshot illustrating an operation analytic repository monitoring system tool, in accordance with embodiments of the present invention;

FIG. 12 is a screenshot illustrating an operation analytic repository monitoring system tool, in accordance with embodiments of the present invention;

Figure 13:
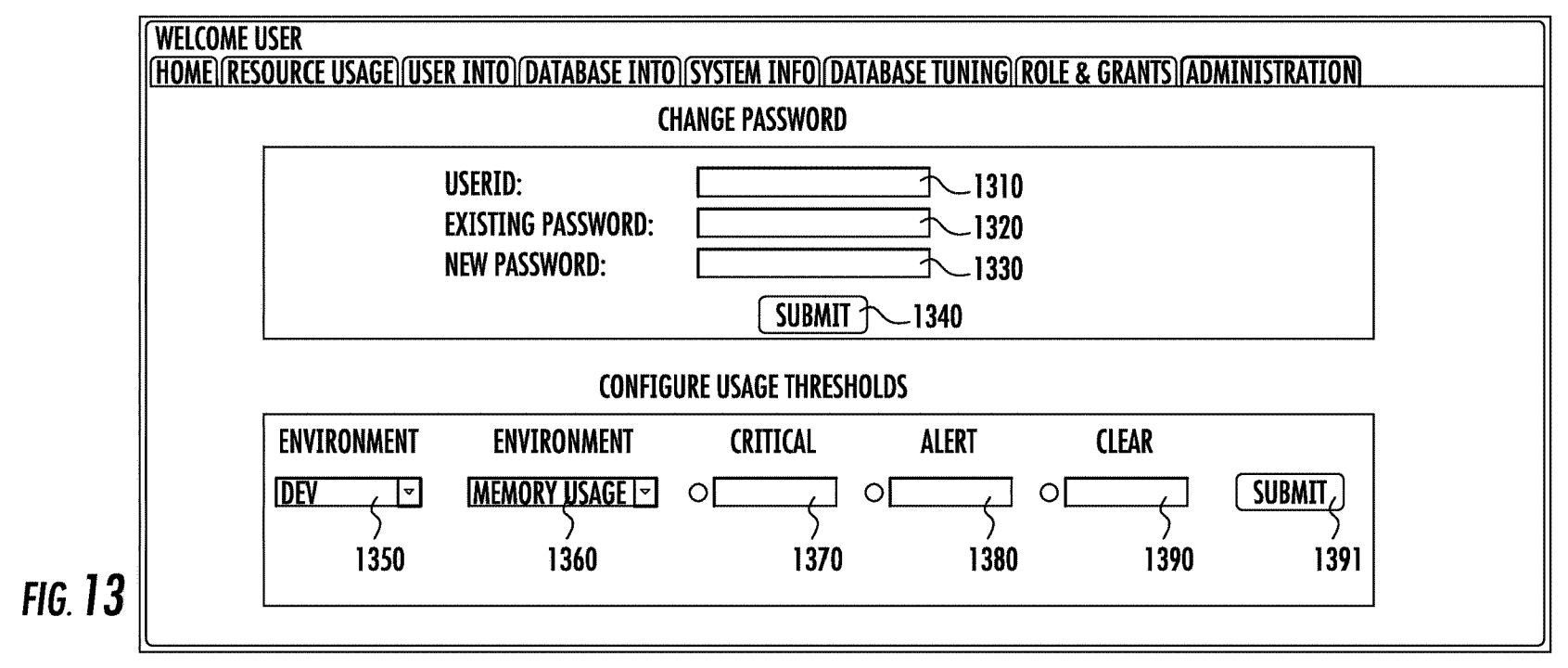

FIG. 13 is a screenshot illustrating an operation analytic repository monitoring system tool, in accordance with embodiments of the present invention;

FIG. 14 is a screenshot illustrating an operation analytic repository monitoring system tool, in accordance with embodiments of the present invention; and FIG. 15 is a diagram illustrating a networking environment system, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for use in operation analytic repository monitoring systems such that proactive monitoring, data analysis, and reactive correction is provided within a single system. The invention enables a system to access a plurality of databases and store portions of data within the databases for short and/or long term monitoring, the system additionally proactively monitors the database to determine whether or not any potential issues exist, and in response to receiving an indication of current issues the system implements one or more processes for correction of the existing issues.

In some embodiments, an "entity" may refer to a business entity that is either maintaining or acting on behalf of an entity maintaining one or more databases for monitoring and data housing. For example, in exemplary embodiments, an entity may be a financial institution, or one or more parties within the financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a customer to establish an account with the entity. An "account" may be the relationship that the customer has with the entity. Examples of accounts include a deposit account, such as a transactional account (e.g., a banking account), a savings account, an investment account, a money market account, a time deposit, a demand deposit, a pre-paid account, a credit account, a non-monetary customer profile that includes only personal information associated with the customer, or the like. The account is associated with and/or maintained by the entity. In other embodiments, an entity may not be a financial institution. In still other embodiments, the entity may be the merchant itself.

In some embodiments, the "customer" or "client" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded).

Method for Providing a Centralized Monitoring System

Referring now to FIG. 1, a high level process flow for providing a template-based message generation tool 100 is illustrated in accordance with one embodiment of the present invention, which will be discussed in further detail throughout this specification. As illustrated, the method may comprise a plurality of steps, including but not limited to, accessing one or more databases within an operation analytic repository having data stored therein 110, storing at least a portion of the data stored within the at least one database, for a predetermined time period, for analysis 120, processing, for at least one of the databases, a proactive action whereby the proactive action implements an ongoing health assessment of the data stored within the at least one database 130, and automatically generating a message comprising the received information 140, and in response to receiving indication of an issue within at least one of databases, provide a reactive action whereby the reactive action determines one or more steps necessary to correct the issue 150.

At step 110, the system may first access one or more databases within an operation analytic repository, where the databases may contain stored data related to the day-to-day operations of a specific business entity. In one embodiment, the databases may include but not be limited to, a production database, a contingency database, a user acceptance testing ("UAT") database, a development database, and/or the like. In some embodiments, the multiple databases may be individually or collectively housed on a database server. In such an embodiment, access to the database may first require having access to a server driver or applet that is configured to provide communication with the server from a user access location such as a desktop or laptop computer. Thus in some embodiments, the system may provide a server driver for download or temporary launch on a user device for the purpose of establishing communication with the database server. As used herein the server driver may refer to any application that is configured for communication with a database server. As such the server driver may provide a user interface that allows the user to implement one or more commands to be processed on the corresponding server for the purpose of instruction implementations, data querying, and the like.

In some embodiments, the database server or individual databases housed therein may be protected such that access to a database may first require authenticating the user's identity or requesting user login credentials. For example, a user may access a server driver linked for communication with one or more databases, the user may then provide input within the server driver that specifies a specific database for connection and/or for access to be granted to. The system may then determine whether or not the selected or specified database requires user authentication credentials, and in response to determining the database requires user authentication credentials, prompt the user to provide one or more authentication credentials such as a user identification number and corresponding password. After verifying the validity of the authentication credentials provided by the user, access may be granted to the specified database.

In an exemplary embodiment, the authentication is based at least partially on user input or general information that verifies that user is authorized to access the database and the data stored therein. The user input or general information may be received from a user access device via the server driver. The user input or general information may typically comprise one or more authentication credential associated with the user. The requested and/or received authentication credentials may vary based on the database being access, and more specifically the type of actions that the user may complete (or is expected to complete) throughout the session. In this way, numerous types and levels of user authentication may exist, and the user may be initially authenticated for a primary level of access to conduct general actions within the database (e.g. view or query data), and the user may be required to provide a subsequent stricter authentication in an instance where a need exists to conduct an action that is not provided within the primary level of access received (e.g. delete data). For example, the primary level of access may include the user being able to query data maintained within a database by providing a user identification number such that the user is able to receive access to an interface that allows for viewing data within the database. In an event that the user decides to launch a script for long term monitoring or manipulation of the data, the user may be required to provide additional authentication credentials, such as a password, prior to being granted access to perform additional actions within the server. The user authentication credentials that may include, but not be limited to, a username, user identification number, password, account number, full-length social security number or partial digits, challenge questions, familiar pictures and/or phrases, biometrics, key fob-based alphanumeric codes, and the like. In some embodiments, the user authentication credentials are explicitly provided by the user, and in other embodiments the user authentication credentials are stored within the user's device and automatically transferred, in response to a request, to access the databases on the user's behalf.

At step 120, after accessing the one or more databases within the operation analytic repository, the system may store at least a portion of the data stored within the at least one database for analysis. The data may be stored for a predetermined time period (e.g. hours, days, weeks, months, years, quarterly, and the like). The predetermined time period may be defined by the user based on user preferences, or defined based on business rules associated with the entity responsible for maintaining the databases, or the businesses associated with the data being maintained. Inasmuch, it should be noted that the system may be configured such that any predefined parameters or definitions such as a predetermined period of time may be overridden by one of the previous definitions disclosed herein based on the priority of the entity responsible for providing the definition. For example, in one embodiment, priority may be assigned to a business associated with the data being maintained such that if a user has specified in there user preferences that data should be stored for the period of one (1) year, and the related business has defined within their business preferences that data should be stored for a maximum of six (6) months, then the later definition of the predetermined period of time will override the user preferences such that the data is only stored for a predetermined period of six (6) months. In some embodiments, the system may restrict an entity (e.g. user, business, or the like) for defining a predetermined period of time that conflicts that a prioritized definition for a predetermined period of time. For example, in one embodiment, priority may be assigned to a business associated with the data being maintained such that if a user attempts to specify in there user preferences that data should be stored for the period of one (1) year, and the related business has defined within their business preferences that data should be stored for a maximum of six (6) months, then the later definition of the predetermined period of time will override the user preferences such that the system may prompt the user to provide a predetermined period of six (6) months or less.

In some embodiments, storing at least a portion of the data stored within the at least one database for analysis comprises maintaining the data within the current database such that the data is preserved and not manipulated during the predetermined period of time. In such an embodiment, a business may benefit from low data storage allocation by not allocating storage means to duplicated data. In such an embodiment, the data may be determined to be "frozen" within the predetermined period of time such that a user cannot delete or otherwise edit the original data stored within the database. In other embodiments, storing at least a portion of the data stored within the at least one database for analysis comprises maintaining the data within a separate database such that the data is copied and preserved on an separate database during the predetermined period of time. In such an embodiment, a business may benefit from maximum data preservation by providing a duplication of the originally monitored data. In such an embodiment, the data may be determined to be manipulated within the predetermined period of time such that a user can monitor the data and process edits within the data for the purpose of correcting potential issues without modifying or causing damage to the original data stored within the database.

In some embodiments, storing at least a portion of the data within the at least one database for analysis further comprises analyzing the stored data on a periodic or continuous basis, where the period or length of monitoring may be based on or defined by user preferences, business rules associated with either the entity responsible for maintaining the databases or the businesses associated with the data being maintained. In some embodiments, analysis may be implemented via a centralized web-based monitoring tool such that a central view of data or corresponding analytics related to a plurality of databases may be displayed in a central location. It should be noted that the phrases "centralized web-based monitoring tool", "centralized monitoring tool", and/or "central monitoring tool" may be used interchangeably throughout the specification. As illustrated in FIG. 5, access to the monitoring tool may further comprise user authentication credentials (as previously discussed herein) prior to being able to view data or corresponding analytics within the tool. The user may be presented an interface that presents one or more user input for providing user authentication credentials. For example, a user identification input field 510 may be presented and configured for receiving and verifying a user identification number, and a password input field 520 may be presented and configured for receiving and verifying a user password. As previously discussed herein, in some embodiments, the level of functionality granted within the central monitoring tool may be based on the authentications credentials provided, and more specifically, the types of authentication credentials provided (e.g. the number of credentials, the level of stringency of credentials). In some embodiments, the server driver and the centralized monitoring tool may be embodied by a single application such that general access to one or more databases and centralized monitoring may be simultaneously granted by provided authentication credentials within the centralized monitoring tool, as illustrated in FIG. 5.

At step 130, the system may process a proactive action for at least one of the accessed databases. In exemplary embodiments, the proactive action may implement an ongoing health assessment of the data stored within the at least one database. To this extent, it should be noted that steps related to the processing of proactive actions and storing and analysis of data as discussed herein may be performed, independently and simultaneously, or dependently and in conjunction with one another. In some embodiments, the proactive action includes proactively monitoring data stored within the one or more databases. The data may be monitored using a plurality of specialized scripts directed toward the monitoring and analysis of specific features or parameters (e.g. memory usage) within the datasets or databases. As used herein, scripts may refer to programs written for a special run-time environment that can interpret (rather than compile) and automate the execution of tasks. As such, in one embodiment the proactive action comprises running at least one monitoring script on at least one database such that the system is configured to launch the monitoring script within the at least one database.

In some embodiments, the system may additionally receive and/or generate reporting results based on the results of the script. In one embodiment, launching the monitoring script on a database in which a potential issue may exist may further comprise the system being configured to receive an indication of the potential issue within at least one of databases based on an analysis of the results within the scripts. In some embodiments, alert thresholds may be defined such that in instances where a parameter is determined to exceed a threshold the system may be configured to alert an entity of a potential issue within the data.

In some embodiments, in response to receiving an indication of a potential issue with the at least one database the system may be configured to notify at least one party of the potential issue within the at least one of database. The entity may be notified via email messaging, internal messaging within the centralized monitoring tool, notification flagging of a particular database, text messaging, multimedia messaging and the like. In such an embodiment, contact information and preferences for notifying a particular entity of a potential issue may be defined with the centralized monitoring tool prior to the commencement of data monitoring.

In some embodiments, receiving indication of the potential issue with the at least one database may comprise the system being configured to automatically correct the potential issue within the at least one of database, or determine one or more steps to automatically correct the potential issue. For example, if is determined that a particular database has reached ninety percent (90%) usage of it processing memory, the system may determine to automatically allocated additional memory for the database. In one embodiment, the system may allocate storage from an less active database in response to determining that a more active database has almost utilized is maximum memory capacity. In some instances, the system may be restricted from automatically correcting a potential issue based on the severity of the issue as defined by one or more user preferences or business rules. In a situation where the potential issue is determined to be too severe for automatic correction, the system may simply notify an appropriate entity and indicate that manual action is required for correcting the potential issue. The system may additionally provide repetitive reminder updates in instances where a potential issue has remained idle or unchanged, thus indicating the issue has not been manually corrected by an entity. In such an embodiment, the notification may comprise a user input field for the user to specify whether they plan to manually correct the issue, and whether or not reminder updates should be periodically transmitted on behalf of the potential issue.

At step 140, in response to receiving an indication of an issue within at least one of databases, provide a reactive action whereby the reactive action determines one or more steps necessary to correct the issue. As such in addition to receiving indication of potential issues within one or more databases, the system may be additionally configured to receive indications of current or real-time issues within databases either from an end-user of an associated system or based on a monitoring and analysis process as previously discussed herein.

In one embodiment, receiving an indication of an issue within at least one database comprises receiving a message, alert, or the like from an end user of the system indicating the issue within the one or more databases. In such an embodiment, the system may receive the message or alert from the end user and subsequently analyze the message to determine whether or not the issue may be resolved. In response to determining the issue may resolved the system may automatically determine one or more steps for resolving the issue and subsequently implement the one or more steps. In response to determining the issue cannot be resolved, the system may automatically determine escalate the issue to a third party entity or system for resolution. Escalating the issue for resolution may further comprises forwarding the message to the third party entity or system. In some embodiment, the system may maintain a record log of both potential, and current and/or real time issues. The log may include various parameters related to the issue such as through which process the issue was discovered (e.g. proactive, analysis, or reactive), who the issue was discovered by (if reactive), whether or not the issue was resolved/escalated, the date and/or time that the issue was resolved/escalated, the entity or system that the issue was escalated to, and the like. Based on an alert, the system or an associated support team may take necessary corrective action to resolve the issue.

Now referring to FIG. 2, FIG. 2 illustrates a detailed process flow of a method for providing an operation analytic repository monitoring system according to embodiments of the present invention. As illustrated, at step 210, the system may first provide an analysis of stored data via a centralized web-based monitoring tool. During the analysis, at step 212, the system may check the data and analysis reports such as the system resource trend analysis. The system may then identify potential improvements within the data and monitor the data on a regular basis to determine whether or not the improvements within the database are necessary. If the identified improvements are determined to be necessary, the system may proceed, at step 214, to take action to implement the identified improvements. If the identified improvements are determined to not be necessary, the process may be terminated. It should be noted, that after taking action, at step 214, to implement the identified improvements, the process may become an iterative process as the system may proceed again to step 212 to check the data and the analysis reports. As further illustrated at step 220, the system may frequently implement script based health checks within the data. During the health check, at step 222, the system may determine whether or not the outputted results are within a predefined threshold limit to indicate whether or not a potential issue exists within the data. If it is determined that the output is above the threshold and a potential issue exists, the system may proceed, to step 224, and analyze the issue to determine whether or not it may be resolved and notify the entity of such analysis. The entity may further provide manual instructions to aid in analysis of determining whether or not it may be resolved. Alternatively, if it is determined that the output is below the threshold and a potential issue does not exist, the process may be terminated. At step 224, if it is determined that the issue may be resolved, the system may proceed to step 226, and resolve the issue or determine one or more steps necessary to implement for resolving the issue, and after resolving the issue, the process may be terminated. At step 224, if it is determined that the issue may not be resolved, the system may proceed to step 228, and escalate the issue to a third party entity or system, and the process may then be terminated. As further illustrated at step 240, the system may receive an indication that an issue exists such as an email complaint from an end user. The system may then proceed, to step 224, and analyze the issue to determine whether or not it may be resolved. At step 224, if it is determined that the issue may be resolved, the system may proceed to step 226, and resolve the issue or determine one or more steps necessary to implement for resolving the issue, and after resolving the issue, the process may be terminated. At step 224, if it is determined that the issue may not be resolved, the system may proceed to step 228, and escalate the issue to a third party entity or system, and the process may then be terminated.

Now referring to FIG. 3, FIG. 3 illustrates a detailed process flow of a method for providing an operation analytic repository monitoring system according to embodiments of the present invention. As illustrated, at step 320, the system may first provide an analysis of stored data via a centralized web-based monitoring tool. During the analysis, at step 312, the system may individually communicate with a plurality of databases and fetch data for display within the centralized web-based monitoring tool. The system may then, at step 314, the system may receive user input that includes one or more authentication credentials for accessing the centralized web-based monitoring tool, and further specifies a selection of at least one database for analysis. At step 316, the system may check the data within the selected database and analysis reports such as the system resource trend analysis. The system or an end user may then, at step 318, based on trend analysis study, identify potential improvements within the data and monitor the data on a regular basis to determine whether or not the improvements within the database are necessary. If the identified improvements are determined to be necessary, the system may proceed, at step 319, to take action to implement the identified improvements. If the identified improvements are determined as not necessary, the process may be terminated. It should be noted, that after taking action, at step 319, to implement the identified improvements, the process may become an iterative process as the system may proceed again to step 326 to check the data and the analysis reports.

As further illustrated at step 320, the system may frequently implement script based health checks within the data, where the scripts may include event based scripts, monitoring, and health check scripts, and the like. At step 322, the system may determine whether or not the outputted results are as expected within a predefined threshold limit to indicate whether or not a potential issue exists within the data. If it is determined that the output is above the threshold and a potential issue exists, the system may send alerts and/or warning to the entity (e.g. support team/end user), and at step 324, analyze the issue to determine whether or not it may be resolved. Alternatively, if it is determined that the output is below the threshold and a potential issue does not exist, the process may be terminated. At step 324, if it is determined that the issue may be resolved in-house (e.g. within the associated entity), the system may proceed to step 326, and resolve the issue or determine one or more steps necessary to implement for resolving the issue, and after resolving the issue, the process may be terminated. At step 324, if it is determined that the issue may not be resolved, the system may proceed to step 328, and escalate the issue to a third party entity or system, and the process may then be terminated.

Now referring to FIG. 4, FIG. 4 illustrates a detailed process flow of a method for providing an operation analytic repository monitoring system according to embodiments of the present invention. As illustrated, at step 410, the system may first provide an analysis of stored data via a centralized web-based monitoring tool. During the analysis, at step 412, a script(s) may communicate with the plurality of databases and fetch data for storage within a relational database management system. At step 413, the system may then communicate with the relational database management system to fetch data for display within the centralized web-based monitoring tool. The system may then, at step 414, receive user input that includes one or more authentication credentials for accessing the centralized web-based monitoring tool, and further specifies a selection of at least one database for analysis. At step 416, the system may check the data within the selected database and analysis reports such as the system resource trend analysis. The system may then, at step 418, identify potential improvements within the data and monitor the data on a regular basis to determine whether or not the improvements within the database are necessary. If the identified improvements are determined to be necessary, the system may proceed, at step 419, to take action to implement the identified improvements. If the identified improvements are determined to not be necessary, the process may be terminated. It should be noted, that after taking action, at step 419, to implement the identified improvements, the process may become an iterative process as the system may proceed again to step 416 to check the data and the analysis reports.

As further illustrated at step 420, the system may frequently implement script based health checks within the data, where the scripts may include event based scripts, monitoring, and health check scripts, and the like. At step 422, the system may determine whether or not the outputted results are as expected within a predefined threshold limit to indicate whether or not a potential issue exists within the data. If it is determined that the output is above the threshold and a potential issue exists, the system may proceed, to step 424, and analyze the issue to determine whether or not it may be resolved. Alternatively, if it is determined that the output is below the threshold and a potential issue does not exist, the process may be terminated. At step 424, if it is determined that the issue may be resolved, the system may proceed to step 426, and resolve the issue or determine one or more steps necessary to implement for resolving the issue, and after resolving the issue, the process may be terminated. At step 424, if it is determined that the issue may not be resolved, the system may proceed to step 428, and escalate the issue to a third party entity or system, and the process may then be terminated.

Centralized Monitoring System Tool

Referring now to FIG. 5 through FIG. 12, FIG. 5 through FIG. 12 provide more detailed illustrations of the centralized web-based monitoring tool according to various embodiments discussed herein. The centralized monitoring tool may comprises various tabs or categories for selection including, but not limited to, a home page, resource usage information, user information, database information, system information, database tuning, roles and grants information, administration information, and the like. As illustrated in FIG. 5, and previously discussed herein, the centralized monitoring tool may comprise an interface that presents one or more user input fields for receiving user authentication credentials prior to granting access to the centralized monitoring tool. For example, a user identification input field 510 may be presented and configured for receiving and verifying a user identification number, and a password input field 520 may be presented and configured for receiving and verifying a user password.

As illustrated in FIG. 6, the centralized monitoring tool may further comprise an interface that presents threshold and server status information for one more servers or related databases. The interface may include drop-down menu 610 for receiving selection of an environment for display within the monitoring tool, where the environment may be defined by a database, server, relational database management system, or the like. The interface may further comprise an interface table 620 for providing usage statistics of a selected environment. The table may include a row for each individual node or server for which data is being displayed, and a column for the parameter being displayed (e.g. memory usage, CPU usage, IO usage, and the like. Additional rows and/or columns may be added to the table 620 at user request. In one embodiment, the table 620 may further comprise a "traffic light" 630 or otherwise color coded indication of the status of each parameter within a given server of node. For example, the traffic light may be colored red is a critical issue exists, yellow is an alert or caution exist, and green if the node and parameter are clear of alerts.

As illustrated in FIG. 7, the centralized monitoring tool may further comprise an interface that presents more detailed server status information for one more servers or related databases. It should be noted that as used herein the terms "node" and "server" may be used interchangeably. The interface may include column for each individual node or server for which data is being displayed, and a row for the parameter being displayed. As such the rows within the table may include, but not be limited to, the node name, host name, current state, node address, export address, catalog path, process size, process residence set, process shared memory, and the like.

As illustrated in FIG. 8, the centralized monitoring tool may further comprise an interface that presents detailed system resource usage information for one more servers or related databases. The interface may comprise a resource pool status table 810, a resource pool status graph 820, and a database resource rejections table 830. The resource pool status table 810 and resource pool status graph 820 may provide both a listed visualization and graphics visualization of resource statistics. As such, the resource pool status table 810 and resource pool status graph 820 may include information such as the pool name, the average actual memory, the average memory in use, and average borrowed memory. The database resource rejections table 830 may provide information related to job or task information. For example, each time a job or task is rejected due to memory usage the rejection information may be recorded within the database resource rejections table 830. The database resource rejections table 830 may include a row for each individual node or server for which data is being displayed, and a column for the parameter being displayed. As such the columns within the table may include, but not be limited to, the node name, pool name, the rejected reason, the rejection type, the number of rejections, the data it was first rejected, the data it was last rejected, the last rejection value, and the like. It should be noted that any data within the tables or graphs discussed herein may be manually or automatically exported from the centralized monitoring tool for the purpose of escalating issues or general data transmission to a third party.

As illustrated in FIG. 9, the centralized monitoring tool may further comprise an interface that presents user login features and user session information for one more servers or related databases. The interface may comprise a user login features table 910, and a user session table 920. The user login features table 910 may include a column for each individual node or server for which data is being displayed, and a row for the parameter being displayed. As such the rows within the table may include, but not be limited to, the node name, user name, database name, login time stamp, client host name, reason for login, and the like. The user session table 920 may include a column for each individual node or server for which data is being displayed, and a row for the parameter being displayed. As such the rows within the table may include, but not be limited to, the node name, user name, session identification name, transaction identification number, session start time, session end time, activity indication, client host name, client participant identification number, and the like.

As illustrated in FIG. 10, the centralized monitoring tool may further comprise an interface that presents database information for one more servers or related databases. The interface may comprise a database partition status table 910, and a database volume table 1020. The database partition status table 910 may include a column for each individual table for which data is being displayed, and a row for the parameter being displayed. As such the rows within the table may include, but not be limited to, the table identification name, the table name, the table scheme, the projection identification number, the projections name, the projection scheme, the partition reorganization percent, and the like. In such an embodiment, the table may display for each projection of each partitioned table, the fraction of its data that is actually partitioned according to a current partition expression. As such, when the partitioning of a table is altered, the value in the field "partition recognized percent" for each of its projections drops to zero and goes reverts back to 100 percent when all of the data is repartitioned. The database volume statistics 1020 may include a column for each table for which data is being displayed, and a row for the parameter being displayed. As such the rows within the table may include, but not be limited to, the table name, the row count, the byte count, and the like.

As illustrated in FIG. 11, the centralized monitoring tool may further comprise an interface that presents database turning information for one more servers or related databases. The interface may comprise a database tuning recommendations table 1110, a database projection storage table 1120, and a projection search input field 1130. The database tuning recommendations table 1110 may include column for each individual observation for which data is being displayed, and a row for the parameter being displayed. As such the rows within the table may include, but not be limited to, the observation count, the first time observed, the last time observed, the tuning parameter, the tuning description, the tuning command, the tuning cost, and the like. The database projections storage table 1120 may include column for each individual node or server for which data is being displayed, and a row for the parameter being displayed. As such the rows within the table may include, but not be limited to, the node name, the projection name, the row count, use bytes, the anchor table names, the anchor scheme name, and the like. User input may be received within the projection search input field 1130 for specifying search parameters within the database projection storage table 1120.

As illustrated in FIG. 12, the centralized monitoring tool may further comprise an interface that presents user roles and grants information for one more servers or related databases. The interface may comprise a database user roles table 1210, a user grants table 1220, a roles for users search input field 1230, a grantee search input field 1240, and an object type search input field 1250. The user roles table 1210 may include column for each individual user for which data is being displayed, and a row for the parameter being displayed. As such the rows within the table may include, but not be limited to the user name, a list of the user roles, a list of the default roles, an indicator of the user's status type, and indicator or whether or not the user is locked, and the like. User input may be received within the roles for users search input field 1230 for specifying search parameters within the user roles table 1210. The user grants table 1220 may include column for each grantor for which data is being displayed, and a row for the parameter being displayed. As such the rows within the table may include, but not be limited to, the grantor, a privilege description, the object schema, the object name, the object type, the grantee and the like. User input may be received within the grantee search input field 1240, and the object type search input field 1250 for specifying search parameters within the user grants table 1220.

As illustrated in FIG. 13, the centralized monitoring tool may further comprise an interface modifying user administration credentials. The interface may include a user identification input field 1310, existing password field 1320, and new password field 1330 for receiving user input to change the password. The system may be configured to save new password based on the user input and selection of the submit button 1340. The interface may further include an environment drop down menu 1350, parameter drop down menu 1360, critical input field 1370, alert input field 1380, and clear input field 1390 for configuring environment usage thresholds. The system may be configured to save input thresholds based on the user input and selection of the save button 1391.

As illustrated in FIG. 14, the centralized monitoring tool may further comprise an interface modifying user administration credentials. The interface may include a first name input field 1410, last name field 1420, user identification input field 1430 and roles selection menu 1440 for receiving user input to provision a new or existing user. The system may be configured to provision the new or existing user based on the user input and selection of the submit button 1450. In this way the user may create newly provisioned user of alter the provisioned of existing users. In response to selecting the submit button 1450, the system may be configured to override old user provisions. In response to selecting the Go button 1460, the system may automatically populate information within the field for the inputted user identification credential. The system may be configured to update the provisions of an existing user based on the user input and selection of the update button 1470.

Network Environment for Providing a Centralized Monitoring System

Referring to FIG. 15, a network environment is illustrated in accordance with embodiments of the present invention. As illustrated in FIG. 15, the remote storage server 1502 is operatively coupled via a network 1501 to the user computing device 1504 and/or a remote database server 1506. In this configuration, the remote storage server 1502 may send information to and receive information from the user computing device 1504 and/or the remote database server 1506. Additionally, the user computing device 1504 may send and receive information directly from the remote database server 1506. The remote storage server 502 may be or include one or more network base stations or other network components. FIG. 15 illustrates only one example of an embodiment of a network environment 1500, and it will be appreciated that in other embodiments one or more of the systems, devices, or servers may be combined into a single system, device, or server, or be made up of multiple systems, devices, or server.

The network 1501 may be a global area network (GAN), such as the Internet, a wide area network (WAN), a local area network (LAN), a telecommunication network or any other type of network or combination of networks. The network 1501 may provide for wire line, wireless, or a combination wire line and wireless communication between devices on the network 1501.

As illustrated in FIG. 15, the remote storage server 1502 generally comprises a communication device 1550, a processing device 1552, and a memory device 1554. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combination of the foregoing. Control and signal processing functions of the system are allocated between these processing devices according to their respective capabilities. The processing device may include functionality to operate one or more software programs based on computer readable instructions thereof, which may be stored in a memory device.

The processing device 1552 is operatively coupled to the communication device 1550 to communicate with the network 1501 and other devices on the network 1501. As such, the communication device 1550 generally comprises a modem, server, or other device for communicating with other devices on the network 1501.

As further illustrated in FIG. 15, the network remote storage server 1502 comprises computer readable instructions 1558 of an application 1560. In some embodiments, the memory device, 1554 includes data storage 1556 for storing data related to and/or used by the application 1560. The application 1560 may perform one or more of the steps and/or sub-steps discussed herein and/or one or more steps not discussed herein. For example, in some embodiments, the application 1560 may provide automatically generated messages to be communicated to one or more entities associated with the financial agreement.

As illustrated in FIG. 15, the user computing device 1504 generally comprises a communication device 1530, a processing device 1532, and a memory device 1534. The processing device 1532 is operatively coupled to the communication device 1530 and the memory device 1534. In some embodiments, the processing device 1532 may send or receive data from the user computing device 1504, to the remote storage server 1502 via the communication device 1530 over a network 1501. As such, the communication device 1530 generally comprises a modem, server, or other device for communicating with other devices on the network 1501.

As further illustrated in FIG. 15, the user computing device 1504 comprises computer readable instructions 1538 stored in the memory device 1534, which in one embodiment includes the computer-readable instructions 1538 of an application 1550. In the embodiment illustrated in FIG. 15, the application 15150 allows the user computing device 1504 to be linked to the remote storage server 1502 to communicate, via a network 1501. The application 1550 may also allow the user computing device 1504 to connect directly (i.e. locally or device to device) with the remote database server 1506 for sending and receiving information. The application 1550 may perform one or more of the steps and/or sub-steps discussed herein and/or one or more steps not discussed herein. For example, in some embodiments, the application 1550 may send information for a waiver request.

As illustrated in FIG. 15, the remote database server 1506 may include a communication device 1510, a processing device 1512, and a memory device 1514. The processing device 1512 is operatively coupled to the communication device 1510 and the memory device 1514. In some embodiments, the processing device 1512 may send or receive data from the user computing device 1504 and/or the remote storage server 1502 via the communication device 1510. Such communication may be performed either over a direct connection and/or over a network 1501. As such, the communication device 1510 generally comprises a modem, server, or other device for communication with other devices on the network 1501.

As further illustrated in FIG. 15, the remote database server 1506 comprises computer-readable instructions 1518 of an application 1520. In the embodiment illustrated in FIG. 4, the application 1520 allows the database 1506 to be linked to the remote storage server 1502 to communicate, via a network 1501. The application 1520 may also allow the user computing device 1504 to connect directly (i.e., locally or device to device) with the remote database server 1506 or indirectly through the network 1501. The application 1520 may perform one or more of the steps and/or sub-steps discussed herein and/or one or more steps not discussed herein.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for use in operation analytic repository database monitoring, whereby the apparatus automatically and continuously monitors and provides corrective actions for detected issues, the apparatus comprising:
   an electronic storage device;
   a computing processor; and
   a module stored in the electronic storage device, said module comprising instruction code executable by one or more computing processors, and configured to cause the one or more computing processors to:
   continuously access one or more operational databases;
   continuously copy data from the one or more operational databases and store the copied data in a separate database, for a predetermined time period;
   receive a threshold value for determining whether or not a potential issue exists, wherein a value above the threshold value indicates that the potential issue exists, and wherein a value below the threshold value indicates that the potential issue does not exist, and wherein the threshold value comprises a metric for determining a database or server environment usage percentage;
   process, for the data, a proactive action, wherein processing the proactive action comprises running one or more monitoring scripts on the data;
   in response to running the one or more monitoring scripts, determine that the potential issue exists in the data, wherein the potential issue is determined to exist based on the threshold value;
   determine a severity of the potential issue;
   in response to determining that the severity of the potential issue is below a severity threshold, automatically correct, without manual intervention, the potential issue, and implement an ongoing health assessment of the data to determine if the potential issue persists, and wherein the potential issue is not automatically corrected, without manual intervention, if the severity of the potential issue is above the severity threshold;
   in response to determining that the severity of the potential issue is above the severity threshold, apply a second severity threshold to determine whether the potential issue must be escalated to a third party, wherein the potential issue is escalated to a third party if the severity of the potential issue is above the second severity threshold;

provide a central monitoring tool to a user, and wherein the central monitoring tool comprises an interface such that information related to the data is displayed within the central monitoring tool;

fetch data from the separate database for presentation within the central monitoring tool, wherein the fetched data comprises a user roles table and a user grants table related to the one or more operational databases; and present the fetched data from the separate database via the interface.

2. The apparatus of claim 1, wherein the module is configured to cause one or more computing processors to notify at least one party of the potential issue.

3. The apparatus of claim 1, wherein the module is configured to cause one or more computing processors to:
receive one or more authentication credentials from the user via the interface; and
prior to presenting the fetched data via the interface, authenticate the user's identity based at least in part on validating the one or more authentication credentials.

4. The apparatus of claim 3, wherein the module is configured to cause one or more computing processors to:
receive a user-specified script via the interface;
receive one or more additional authentication credentials from the user via the interface;
validate the one or more additional authentication credentials;
in response to validating the one or more additional authentication credentials, launch the user-specified script.

5. The apparatus of claim 1, wherein the module is configured to cause one or more computing processors to analyze the data on periodic, semi-periodic, or continuous basis.

6. The apparatus of claim 5, wherein analyzing the data comprises:
monitoring the data;
identifying one or more parameters for improvement within the data;
determining whether or not the one or more parameters for improvement within the data are necessary; and
in response to determining the one or more parameters for improvement within the data are necessary, implementing at least one action to improve the data.

7. The apparatus of claim 1, wherein the module is configured to cause one or more computing processors to maintain a record log of indications of an issue within the one or more operational databases.

8. The apparatus of claim 1, wherein the module is configured to cause one or more computing processors to:
identify and analyze a second potential issue in the data; and
determine, based on results of the analysis, whether or not the second potential issue can be resolved by the apparatus.

9. The apparatus of claim 8, wherein the module is configured to cause one or more computing processors to in response to determining the second potential issue can be resolved by the apparatus, implementing one or more steps for resolving the second potential issue.

10. The apparatus of claim 8, wherein the module is configured to cause one or more computing processors to in response to determining the second potential issue cannot be resolved by the apparatus, determining to automatically escalate the second potential issue to a third party system or entity for resolution.

11. The apparatus of claim 1, wherein the potential issue comprises a first database of the one or more operational databases utilizing a maximum memory capacity.

12. The apparatus of claim 11, wherein automatically correcting the potential issue comprises allocating storage from a second database to the first database based on determining that the second database is less active than the first database.

13. The apparatus of claim 1, wherein the interface of the central monitoring tool is configured to receive the threshold value from the user.

14. A computer implemented method for use in operation analytic repository database monitoring, whereby the method comprises automatically monitoring and providing corrective actions for detected issues, the method comprising:
accessing one or more operational databases;
copying data from the one or more operational databases and storing the copied data in a separate database, for a predetermined time period;
receiving a threshold value for determining whether or not a potential issue exists, wherein a value above the threshold value indicates that the potential issue exists, and wherein a value below the threshold value indicates that the potential issue does not exist, and wherein the threshold value comprises a metric for determining a database or server environment usage percentage;
processing, for the data, a proactive action, wherein processing the proactive action comprises running one or more monitoring scripts on the data;
in response to running the one or more monitoring scripts, determining that the potential issue exists in the data, wherein the potential issue is determined to exist based on the threshold value;
determining a severity of the potential issue;
in response to determining that the severity of the potential issue is below a severity threshold, automatically correcting, without manual intervention, the potential issue, and implement an ongoing health assessment of the data to determine if the potential issue persists, and wherein the potential issue is not automatically corrected, without manual intervention, if the severity of the potential issue is above the severity threshold;
in response to determining that the severity of the potential issue is above the severity threshold, apply a second severity threshold to determine whether the potential issue must be escalated to a third party, wherein the potential issue is escalated to a third party if the severity of the potential issue is above the second severity threshold;
providing a central monitoring tool to a user, and wherein the central monitoring tool comprises an interface such that information related to the is displayed within the central monitoring tool;
fetching data from the separate database for presentation within the central monitoring tool, wherein the fetched data comprises a user roles table and a user grants table related to the one or more operational databases; and
presenting the fetched data from the separate database via the interface.

15. The method of claim 14 further comprising:
identify and analyze a second potential issue in the data; and determining, based on results of the analysis, whether or not the second potential issue can be resolved.

16. A computer program product for use in operation analytic repository database monitoring, whereby the computer program product automatically monitors and provides corrective actions for detected issues, the computer program product comprising:

a non-transitory computer-readable medium comprising a set of codes for causing a computer to:

access one or more operational databases;

copy data from the one or more operational databases and store the copied data in a separate database, for a predetermined time period;

receive a threshold value for determining whether or not a potential issue exists, wherein a value above the threshold value indicates that the potential issue exists, and wherein a value below the threshold value indicates that the potential issue does not exist, and wherein the threshold value comprises a metric for determining a database or server environment usage percentage;

process, for the data, a proactive action, wherein processing the proactive action comprises running one or more monitoring scripts on the data;

in response to running the one or more monitoring scripts, determine that the potential issue exists in the data, wherein the potential issue is determined to exist based on the threshold value;

determine a severity of the potential issue;

in response to determining that the severity of the potential issue is below a severity threshold, automatically correct, without manual intervention, the potential issue, and implement an ongoing health assessment of the data to determine if the potential issue persists, and wherein the potential issue is not automatically corrected, without manual intervention, if the severity of the potential issue is above the severity threshold;

in response to determining that the severity of the potential issue is above the severity threshold, apply a second severity threshold to determine whether the potential issue must be escalated to a third party, wherein the potential issue is escalated to a third party if the severity of the potential issue is above the second severity threshold;

provide a central monitoring tool to a user, and wherein the central monitoring tool comprises an interface such that information related to the is displayed within the central monitoring tool;

fetch data from the separate database for presentation within the central monitoring tool, wherein the fetched data comprises a user roles table and a user grants table related to the one or more operational databases; and present the fetched data from the separate database via the interface.

17. The computer program product of claim 16, the computer program product further comprising a set of codes for causing a computer to:

identify and analyze a second potential issue in the data; and determine, based on results of the analysis, whether or not the second potential issue can be resolved.

* * * * *